No. 694,512. Patented Mar. 4, 1902.
T. A. WOOLEY & H. FOX.
MACHINE FOR SHOCKING GRAIN.
(Application filed Mar. 5, 1901.)

(No Model.) 6 Sheets—Sheet 1.

No. 694,512.  
Patented Mar. 4, 1902.

T. A. WOOLEY & H. FOX.  
MACHINE FOR SHOCKING GRAIN.  
(Application filed Mar. 5, 1901.)

(No Model.)  
6 Sheets—Sheet 2.

Witnesses  
B. E. Herald  
John A. Turner

Inventor  
Thomas Arthur Wooley and Herbert Fox  
By John K. Hendry, Atty

No. 694,512. Patented Mar. 4, 1902.
T. A. WOOLEY & H. FOX.
MACHINE FOR SHOCKING GRAIN.
(Application filed Mar. 5, 1901.)

(No Model.) 6 Sheets—Sheet 3.

Fig. III.

Witnesses
B. E. Herald
John A. Turner

Inventors.
Thomas Arthur Wooley and Herbert Fox.
By John K. Hanary, Atty.

THE NORRIS PETERS CO., PHOTO-LITHO., WASHINGTON, D. C.

No. 694,512.  
T. A. WOOLEY & H. FOX.  
MACHINE FOR SHOCKING GRAIN.  
(Application filed Mar. 5, 1901.)  
Patented Mar. 4, 1902.

(No Model.)  
6 Sheets—Sheet 4.

Fig. VIII.

Fig. V.   Fig. VI.   Fig. VII.

Witnesses.  
B. E. Herald  
John A. Turner

Inventors.  
Thomas Arthur Wooley  
and Herbert Fox.  
By John H. Hendry, Atty.

No. 694,512.

T. A. WOOLEY & H. FOX.
MACHINE FOR SHOCKING GRAIN.
(Application filed Mar. 5, 1901.)

Patented Mar. 4, 1902.

(No Model.)

Witnesses.
B. E. Herald
John A. Turner

Inventors.
Thomas Arthur Wooley
and Herbert Fox
By John H. Henry, Atty.

No. 694,512. Patented Mar. 4, 1902.
T. A. WOOLEY & H. FOX.
MACHINE FOR SHOCKING GRAIN.
(Application filed Mar. 5, 1901.)

(No Model.) 6 Sheets—Sheet 6.

Fig. XII.

Fig. XIII.

Fig. XIV. Fig. XV.

Fig. XVI.

Fig. XVIII.

Fig. XVII.

Witnesses. Inventors.

UNITED STATES PATENT OFFICE.

THOMAS ARTHUR WOOLEY AND HERBERT FOX, OF HAMILTON, CANADA.

MACHINE FOR SHOCKING GRAIN.

SPECIFICATION forming part of Letters Patent No. 694,512, dated March 4, 1902.

Application filed March 5, 1901. Serial No. 49,778. (No model.)

*To all whom it may concern:*

Be it known that we, THOMAS ARTHUR WOOLEY and HERBERT FOX, citizens of Canada, residing at the city of Hamilton, in the county of Wentworth and Province of Ontario, Canada, have made certain new and useful Improvements in Machines for Shocking Grain; and we do hereby declare the following to be a full, clear, and exact description of the invention, such as will enable others skilled in the art to which it appertains to make and use the same.

Our invention relates to improvements in machines for shocking grain in which a framework with sheaf-receiving mechanism and shock-forming and shock-discharging mechanism is adjustably attached to the sheaf-delivery side of a reaping and binding machine; and the objects of our invention are, first, to provide a machine attached to the side of a binder that shall be capable of receiving the sheaves from said binder, placing each said sheaf in vertical position, forming the sheaves into a shock, binding the shock, and discharging the same in vertical position onto the ground, and to afford facilities for the adjustment of certain mechanism to suit longer or shorter grain or sheaves. We attain these objects by the mechanism illustrated in the accompanying drawing, in which—

Similar letters refer to similar parts throughout the several views.

In the drawing the frame D of the shocking-machine is attached to the sheaf-delivery side of a reaper and binder machine E by means of the carrying transverse tube F, which is adjustably connected to the frame D by means of adjusting-bars H, which are secured to the under side of the sides of the sheaf-receiving end of the frame D and opposite to each other. These bars H have a series of transverse recesses and transversely opposite to each other to admit said tube F to provide end adjustment to the machine. Collars J are provided on the tube F and are adjustably screwed thereto and against said bars H to allow side adjustment to the machine.

Figure 1:
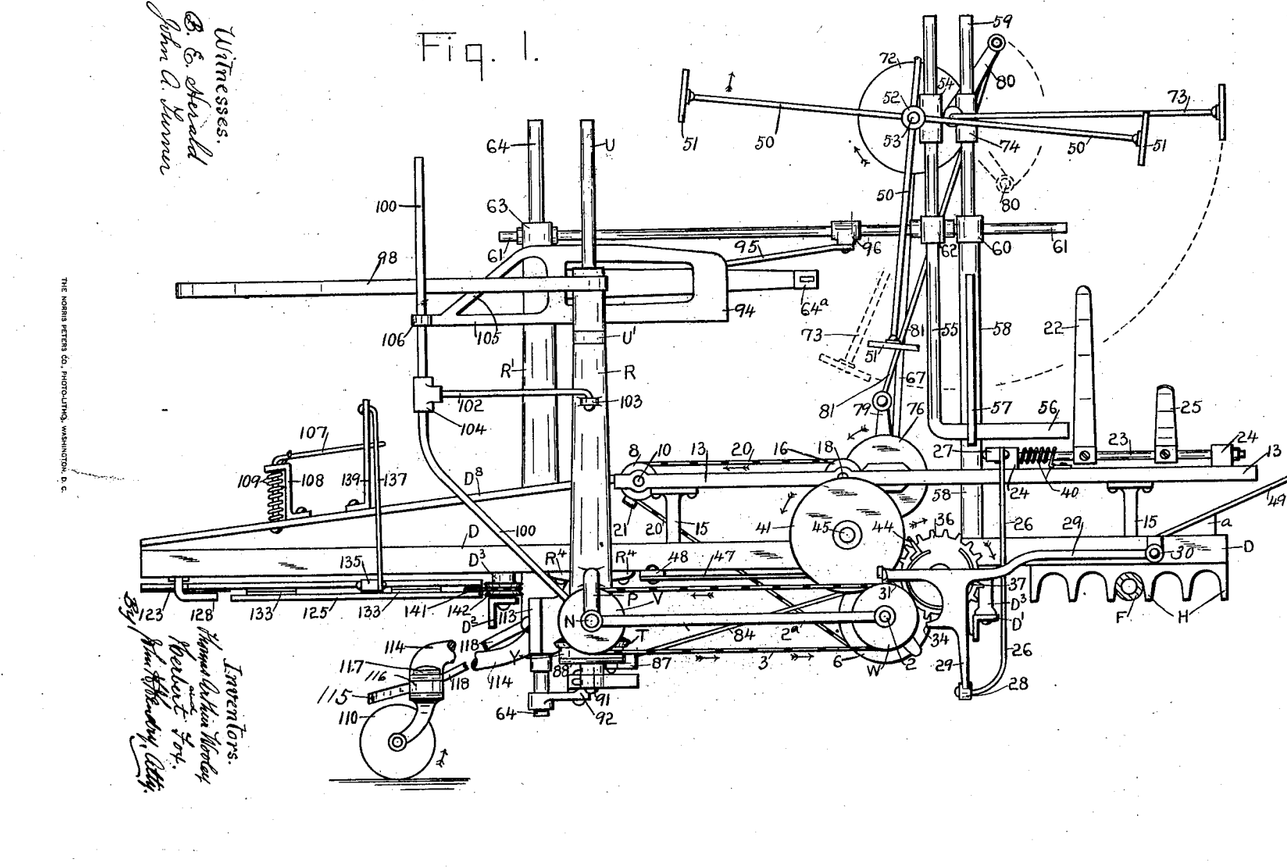
Figure 1 is a side elevation of the shocking-machine and as viewed from the reaper and binder side of the machine, the supporting part of the caster-wheel being broken in order to show the full caster-wheel.
Figure 3:
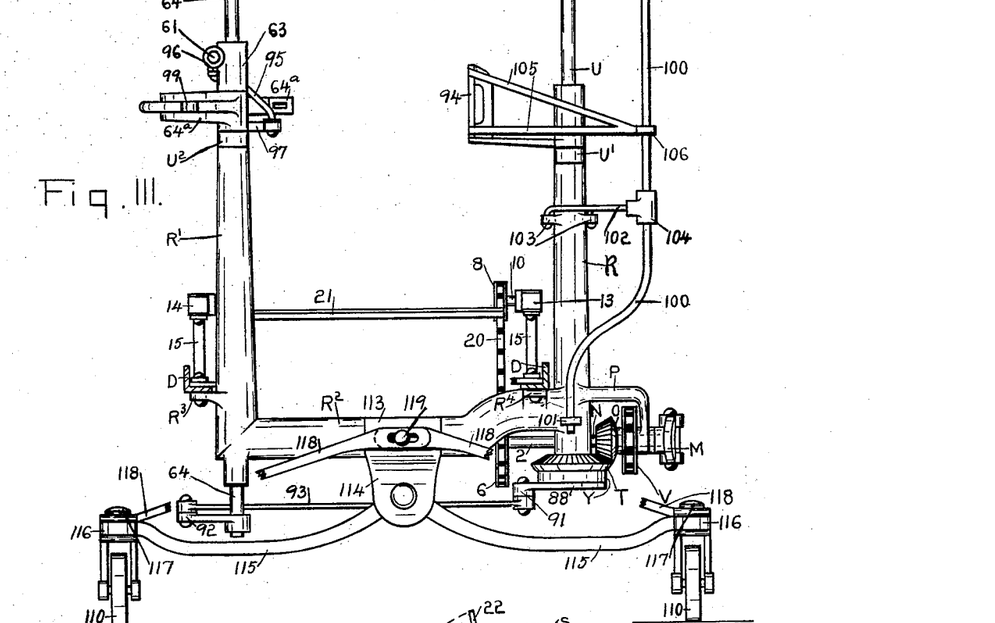
Fig. 3 is an elevation of the machine, partly in section, through the broken line A— —A, as seen in Fig. 2 of the drawing, the braces of the caster-wheels being broken, so as not to obstruct the operating mechanism in this view.
Figures 4, 9:
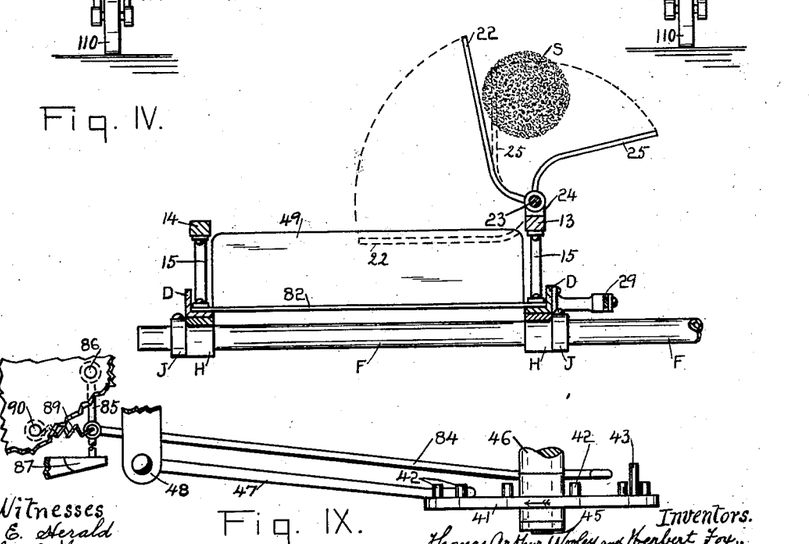
Fig. 4 is an elevation of the machine, through the broken line B— —B, as seen in Fig. 2 of the drawing.
Fig. 9 is an enlarged detail plan of the counter-wheel with its tension-spring and its connecting-rod to release the catch of a clutch to revolve the knotter-shaft once.

The machine is driven by the shaft K, which is connected to revolving mechanism of the reaper and to the transverse shaft N (seen in Figs. 1 and 3 of the drawing) and which extends from the coupling M and through the secured sprocket V and bevel-wheel O and into the lower end of the knotter-column R, which supports the end of said shaft. This shaft N is also supported by a bracket-bearing P on the vertical knotter-column R, as shown in Figs. 1 and 3 of the drawing. The secured wheel O gears into and drives the bevel-wheel T, togther with the clutch-wheel Y, which run loosely on the vertical knotter-shaft U, which operates in and above the column R. The knotter-shaft U has a fast collar U', and the needle-shaft 64 has a fast collar U². These collars rest upon their respective columns and retain their respective shafts in position. The needle-column is indicated by R'. The two columns R and R' are connected together by their bent and oblique tube R², which is underneath the frame D. These columns are secured to the frame D by means of a lug R³ on the needle-column and by the lugs R⁴ on the oblique R². A sprocket-wheel V is secured on the said shaft N and drives the sprocket-wheel W, together with the clutch-wheel Z, which run loosely on the transverse shaft 2. The side strap 2ᵃ (seen in Fig. 1 of the drawing) connects the shafts N and 2 to strengthen said shafts.

3 is a chain which connects the sprockets V and W.

Figures 5, 6, 7, 8:
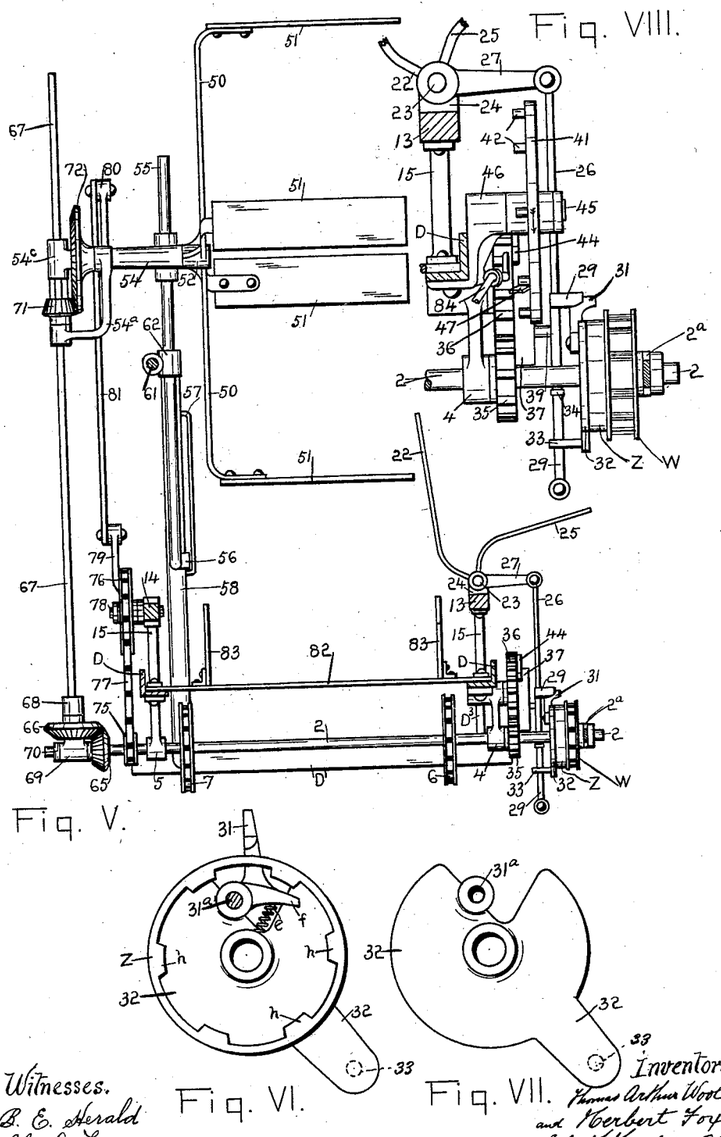
Fig. 5 is an elevation of the machine, through the broken line C— —C, as seen in Fig. 2 of the drawing.
Fig. 6 is an enlarged view of the clutch-wheel as seen without connection to a gear-wheel or to a sprocket-wheel and clutch-plate with clutch-catch in normal position— that is, when the outer or projecting part of the catch is held at rest by a lever or rod, as in the several figures of the drawing.
Fig. 7 is a similar view of the clutch-plate, the clutch-wheel and the clutch-catch being removed to show the opening in the plate for the operation of the catch, a part of which protrudes through the clutch-plate. This clutch-plate has a central hub, which is intended to be secured onto a shaft where seen in the several figures of the drawing.
Fig. 8 is an enlarged end elevation of the counter-wheel, the transverse shaft which drives the reel, and the sheaf-forwarding arm, and mechanism connecting said shaft to the sheaf-receiving arms shown broken and in normal position and as shown in normal position in Figs. 4 and 5 of the drawing.

The shaft 2 is supported by the bearings 4 and 5, which are secured to the frame D, as shown in Figs. 5 of the drawing. The said shaft 2 revolves only at the reception of a sheaf, hereinafter described. The sprocket-wheels 6 and 7 are secured on the shaft 2. These sprockets drive the sprockets 8 and 9, which revolve on rigid studs 10 and 12, which are supported by the horizontal bars 13 and 14, which form a part of the frame D, said bars being supported by the pillars 15, which are secured to the frame D and to said bars 13 and 14. Intermediate and upper guide-rollers 16 and 17 are provided on studs 18 and 19 of the bars 13 and 14. These guide-rollers, together with the sprockets 8 and 9, are driven by the said sprockets 6 and 7 by means of the sprocket-chains 20. These chains 20 carry a transverse bar 21, the function of which is to forward each sheaf S toward the shock-forming receptacle. The sprocket-wheels throughout are preferably constructed with side flanges on a level with the teeth to prevent any possible entanglement of the straws from the sheaves.

Figure 2:
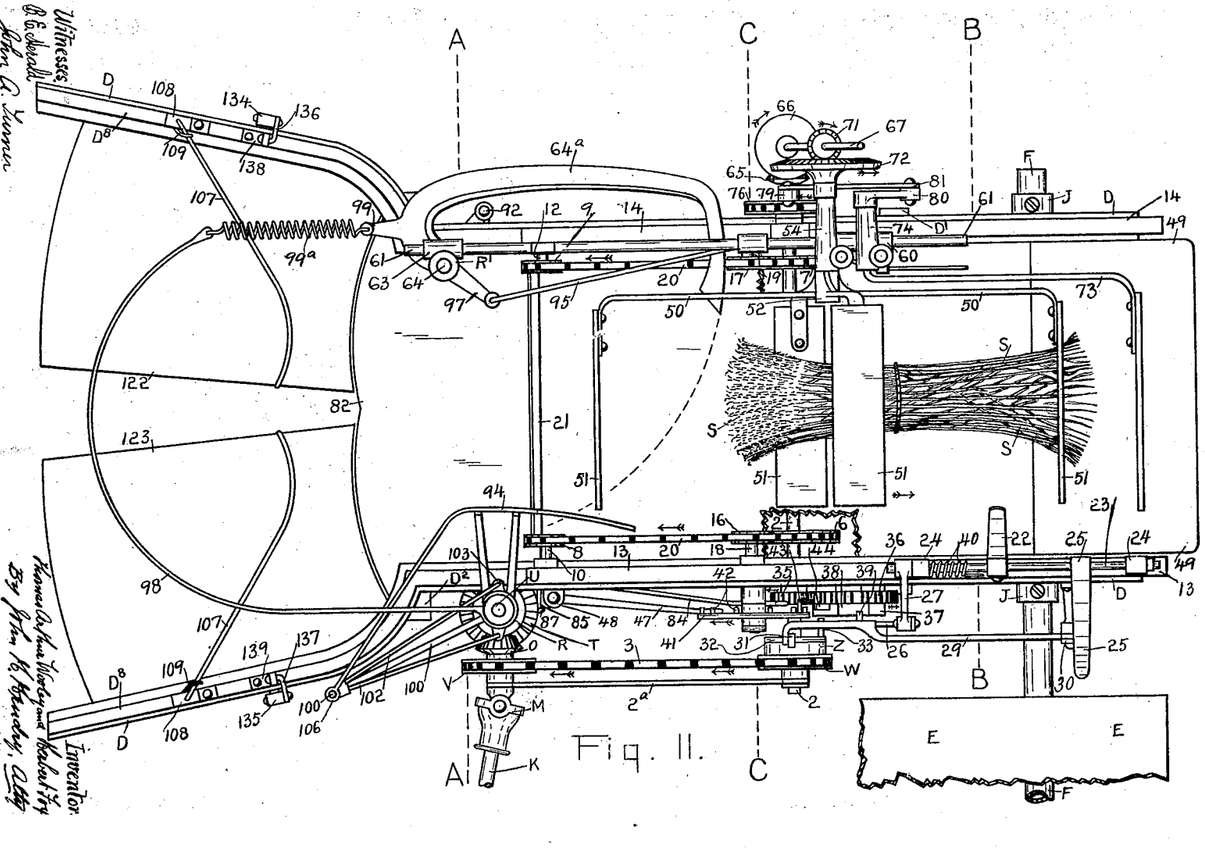
Fig. 2 is a plan of the same, showing the shocking-machine attached to the sheaf-delivery side of a reaper and binder machine and a sheaf delivered on the machine.

The commencement of the operation and the performance of the several operating parts of the shocking-machine is as follows: The sheaf S when delivered from the reaping and binding machine in an horizontal position engages with or strikes the adjustable sheaf-receiving arm 22, which is secured to and capable of sliding or adjustment on its horizontal bar 23 to suit different lengths of sheaves, and which is located at the sheaf-receiving end of the machine and at the reaper side thereof and is capable of oscillating in the bearings 24, secured to the frame D. This arm 22 falls transversely over a part of the machine upon said engagement with the sheaf. The guiding-arm 25 follows the sheaf and assists the sheaf in finding its proper place and may on several occasions act as a flooring in guiding the sheaf. The arms 25 and 22 are both secured on the bar 23 and are both capable of adjustment on said bar nearer to each other or wider apart, as the case may be. The position and progress of these two arms 22 and 25, is seen very fully in broken lines in Fig. IV, of the drawing, the body of the sheaf is also seen in this view, in the act of engaging with the arm 22. When this arm 22 is brought down by the gravity of the sheaf S, the horizontal bar 23 makes about one-fourth of a revolution and at the same time raises the vertical rod 26, which is connected to the rod 23 by means of the crank 27, which is secured to the horizontal bar 23. The lower end of the rod 26 is connected at 28 to the end of the lower extending part of the side arm 29, which is pivoted at 30 to the side of the frame D. The rod 26 lifts the arm 29, and the bent extension at the end of said arm releases a catch 31 of the clutch-plate 32, which when released allows the said plate 32 of the clutch-wheel Z to revolve. This clutch-plate is secured to the shaft 2, and when the arm 29, is disengaged from the catch 31, by means of a sheaf engaging the arm 22, and mechanism connecting the arm 22 with the arm 29, causes the shaft 2, to revolve, in order to drive the said chains 20, with their transverse sheaf-forwarding bar 21, also to revolve the reel one half-revolution, and to operate the independent sheaf-forwarding arm, hereinafter described. This shaft 2 has a secured spur-pinion wheel 35, which makes three revolutions with its shaft 2 and revolves the spur-wheel 36 on rigid stud of the frame D one revolution. The spur-wheel 36 has a projecting flange 37 of cam formation extending almost around the side of the wheel, leaving an opening, as shown in Figs. 1 and 2 of the drawing and indicated 38 in Fig. 2. The opening 38 in the flange 37 of the spur-wheel 36 is to allow the pin 39, which projects from the inner side of the arm 29, to pass through said opening 38, when the arm 29, is lifted higher, as stated, by means of the lifter-pin 33 secured to the clutch-plate 32, said pin 33 engages with the lip 34, of the arm 29, when the clutch-plate on shaft 2, revolves. The pin 39, referred to, after having passed through the said opening 38, the left-hand end of the cam-flange 37, passes underneath said pin 39, causing said pin to be continuously lifted, together with the arm 29, until the spur-wheel 36, has revolved once, and at the same time the pinion-wheel 35, together with its shaft 2, has made three revolutions, and in consequence the chains 20 with their sheaf-forwarding bar 21 revolves once. When the arm 29 is thus raised and the pin 39 is on the cam-flange 37, the said lip 34 of arm 29 is raised sufficiently to allow the lifter-pin 33 on the clutch-plate 32 to pass said lip while the shaft 2, with its clutch-plate, is making its second and third revolutions. Immediately the spur-wheel 36 has made its said one revolution the right-hand end of the cam-flange 37 leaves the pin 39 and frees the same to allow the pin to descend through the opening 38 between the two ends of the cam-flange 37, and consequently the arm 29, to which said pin 39 is secured, descends to its normal position. The descent of the arm 29 to its said normal position is accomplished by means of a spiral spring 40 around a part of the previously-mentioned horizontal bar 23. The ends of said spring is secured to said bar and to the frame D in such a manner that the spring shall be capable of revolving the bar to bring the arms 22 and 25 back to normal or original position, ready to receive another sheaf in proper time. When the shaft 2 is revolving, as set forth, the sheaf counter-wheel 41, having ten teeth or pins 42 at equal distances from the center, and an independent pin 43, all of which project out from the inner side of the counter-wheel 41, which revolves the space of one tooth by means of a side-extending tooth 44 on spur-wheel 36. This tooth 44 engages a pin 42 of said counter at each revolution of the wheel 36, and so on at the said reception of a sheaf. This counter-wheel is capable of revolving loosely on the stud 45 and makes one revolution at the reception of ten sheaves. The stud 45 is secured to the bracket-bearing 46, which is secured to frame D, as shown in Fig. 8 of the drawing. To prevent the counter-wheel from revolving more than the space of one tooth, a tension-spring 47 is fastened to a lug 48 on frame D, as seen more fully in Figs. 2 and 9 of the drawing. This spring 47 engages the counter wheel-pins in succession and sufficiently to retain the same in stopped position until each pin 42 of the counter-wheel is acted upon in succession. The counter is revolved the space of one tooth or pin at the reception of each sheaf by the mechanism herein described. The independent counter-wheel pin 43 revolves with the counter-wheel and operates mechanism for binding the shock and discharging the shock, hereinafter described. At the time as the shaft 2, has begun to revolve, the sheaf S, has been guided to position by the previously-referred-to arms 22, and 25, and placed on the lower blade 51, of the reel-arms 50, said sheaf being in an inclined position, the head being the highest and resting on the said blade 51 of the reel and the butt-end part of the sheaf S resting on the oppositely-inclined board 49, which rests on brackets "a" on the frame D. This board 49 affords a resting-floor for the butt-end of the sheaf. The reel comprises the arms 50, the blades 51, and the hub 52, to which said arms are secured. The hub of the reel is secured on the upper short transverse shaft 53 in transverse bearing 54, which has a lower branch 54$^a$, with upper extension 54$^c$ to support the inclined shaft 67. The bearing 54 is secured to the vertical bar 55, which has a lower end extension 56 at right angles therewith. Said extension 56 is capable of sliding vertically in the guide 57 on the vertical tube 58, which is secured to a side of the frame D and to a lower transverse brace D' of said frame. The brace D', together with a similar brace D$^2$, are held to the frame D by hangers D$^3$. The vertical tube 58 has a vertical post 59 stationary therewith. The post 59 has a hub 60 secured thereto, capable of sliding on its said post. The horizontal sliding bar 61 passes through an extension of the hub 60, which is similar in construction to the hub 62, which is secured on the bar 55. The bar 61 is secured to the hub 62. (Shown in Figs. 1 and 5 of the drawing.) The horizontal bar 61 is held by a hub 63, loosely held on the needle-shaft 64 in its vertical stationary column R', and the bar 61 is capable of sliding through an extension of the hub 63. The reel is revolved one half-revolution by means of a bevel-wheel 65 on the previously-mentioned transverse shaft 2, gearing into the bevel-wheel 66, secured on the lower end of the inclined shaft 67, the lower end of which is held in position and allowed to revolve in the bearing 68, which forms a part of the sleeve 69 on shaft 2. A collar 70 is provided on the end of shaft 2 to retain said sleeve in position, therefore retaining the shafts 67 in position. The upper end of the inclined shaft 67 is held in position by the branch 54$^a$, together with its upper extension 54$^c$ of the reel-bearing 54. A small bevel-wheel 71 is secured on the shaft 67 and gears into a larger bevel-wheel 72 on the reel-shaft 53 to drive said reel one half-revolution when the shaft 2 revolves three times. The sheaf-forwarding arm 73 is operated at the same time as the reel, and its bent right-angle end is supported in a bearing 74, secured on the aforesaid vertical stationary post 59, and is operated by the shaft 2 by means of a sprocket-wheel 75, secured on a shaft 2, revolving a sprocket-wheel 76 one revolution by means of the sprocket-chain 77. The sprocket-wheel 76 revolves on a stud 78, supported by the horizontal bar 14. The sprocket-wheel 76, is provided with an arm 79, which is connected to the crank 80, by means of a connecting-rod 81, this crank 80, forms a part of the bent sheaf-forwarding arm 73. The arm 73 operates at the reception of each sheaf and makes about one-fourth of a revolution, as indicated by a broken arc-line shown in Fig. 1 of the drawing. This arm forwards the butt-end of the sheaf to a position to allow the previously-mentioned transverse bar 21 to take hold of the sheaf and forward the same toward the shock-receptacle. At the time the arm 73 is operating, the reel also is in operation, the lower blade 51 of the reel, on which rests the upper or head part of the sheaf, as received from the binder, revolves together with the arm 73, to place the sheaf in vertical position on the floor 82 of the shocker. These several parts comprising the reel, the sheaf-forwarding arm, and the chain of the sheaf-forwarding bar are all operated at the same time by means of the described mechanism connected to the transverse shaft 2 and to the said several parts. It will be observed that on account of the position of the sheaf-forwarding bar 21 on its chains 20 that the said bar engages with the sheaf at about the same time of the terminus of the sheaf-forwarding arm 73, and when the blade of the reel is bringing the head part of the sheaf upward then the transverse bar 21 engages with the butt-end of the sheaf and the next arm of the reel engages with the head of the sheaf, and together forwards the sheaf to the shock-receptacle—that is, in proximity to the needle and knotter. The sides 83, as seen in Fig. 5, are secured to the floor 82 and guide the sheaf from the receiving end of the machine to the shock-forming end of the machine. When the sheaf has been placed in position as described, the reel has revolved one half-revolution, the sheaf-forwarding arm 73 has been brought back to its normal position, as shown in Figs. 1 and 2 of the drawing, and the sheaf-forwarding bar 21 has also resumed its normal position, as seen in Fig. 1, the reel having made one half-revolution by means of its driving mechanism connected to the transverse shaft 2. The sheaf-forwarding arm having made its described movement by means of the first half-revolution of the sprocket-wheel 76 with its arm 79 and the crank 80 on the end of the bent part of the sheaf-forwarding arm 73, connected by the rod 81, the sheaf-forwarding arm 73 is brought back to normal position on the second half-revolution of the sprocket-wheel 76. The clutch-wheel Z, with its plate 32 and its catch 31, pivoted at 31$^a$ to said plate and lifter-pin 33, previously referred to, is illustrated more fully in enlarged views, as Figs. 6 and 7 of the drawing. The clutch-wheel Z forms a part of the sprocket-wheel W and revolves loosely on the shaft 2, while the clutch-plate 32, with its pivoted catch 31, is secured to the shaft 2, that when the catch 31 is released by mechanism as described the spiral spring $e$ forces the inclosed arm $f$ of the catch to engage with the internal teeth $h$ of the clutch-wheel Z. The said clutch-wheel Z in consequence drives the clutch-plate 32, which is secured on shaft 2. At the reception of each sheaf and the placing of the same in vertical and proper position on the shocker then the sheaf-receiving and sheaf-placing mechanism resumes its normal position and is ready to receive another sheaf and to place the same in position, and so on until the required number of sheaves—say ten, as in this case—are received and placed. The counter-wheel 41 has revolved the space of one tooth or pin 42 at every operation of the sheaf receiving and placing mechanism until ten sheaves are placed on the machine. When this is accomplished, the counter-wheel has revolved nine spaces or nine-tenth revolution. Then the large tooth or pin 43 of the counter-wheel at its one revolution engages with the bent end of the rod 84, which when in operation slides through a lug on bracket-bearing 46, as shown in Fig. 8 of the drawing. The large pin of the counter-wheel 43 draws the rod 84. The other end of said rod is pivotally connected to a short transverse lever 85, pivoted at 86 to the frame and shown in Figs. 2 and 9 of the drawing. The lever 85 engages with and is released from the catch 87 on the clutch-plate 88 of the clutch-wheel Y, secured to the bevel-wheel T, which revolves loosely and continuously on the knotter-shaft U. The clutch-plate 88 is secured to the knotter-shaft, and the whole of this clutch-wheel, with its clutch-plate and catch, is of similar construction to the clutch-wheel on shaft 2, as previously referred to. The lever 85 referred to is held in position of tension to the catch 87 of the clutch-plate 88 by means of a tension-spring 89. When the larger pin 43 of the counter has engaged with the rod 84, the spring 89 draws the lever 85 and the rod 84 to normal position. This spring 89 is secured to a pin 90 on the under side of the frame D and to the lever 85. When the catch 87 is released by means of said mechanism connecting the counter-wheel 41 to the clutch-wheel Y, the knotter-shaft U revolves once, and thereby oscillates the needle-shaft 64. This oscillation of the needle-shaft is accomplished by means of a crank-arm 91, which forms a part of clutch-plate 88 on the knotter-shaft, and a crank 92 on the lower end of the vertical needle-shaft 64, and a connecting-rod 93, connecting said cranks.

When the knotter and the needle shafts are in motion and the needle 64ª brought toward the shield 94 of the knotting device, then the horizontal sliding bar 61, previously referred to, is drawn toward the needle and the knotter by means of a connecting-rod 95, one end of which is secured to said bar 61 at 96 and the other end of said connecting-rod pivoted to a crank 97, secured to the needle-shaft. This horizontal bar 61 brings with it the vertical sliding bar 55, which supports the reel 50, as aforesaid.

By the above operation the reel is brought toward the needle and knotter and toward the then formed shock in order that the shock may be compressed by the then acting one arm 50 and blade 51 of the reel in conjunction with the semicircular hoop-strap 98, as shown in Figs. 1 and 2 of the drawing. The strap 98 is connected to the hub of the knotter device and to an arm 99 of the needle by means of a spiral spring 99ª. This hoop-strap 98, together with its spiral spring 99ª, holds the sheaves together while the shock is being formed, the said spring allowing the hoop 98 to extend or enlarge to suit the gradual increase of the number of sheaves until the shock is formed. Immediately upon the formation of the shock the needle operates with the knotter to tie the shock, which when tied the needle resumes its normal position and relaxes the hoop-strap 98 and frees the shock. At the same time that the reel is engaged with the shock to compress the same the needle draws the strap 98 in close contact with the other side of the shock by means of the arm 99 on the needle being brought around toward the knotter, when the needle is engaged with the knotter, tying the twine around the shock. While the hoop-strap 98 is holding the upper parts of the sheaves intact the arms 107 are suitably curved to hold the lower parts of the sheaves intact. These arms 107 are pivoted to bearings 108, which are secured to the sides D⁸ of the frame. The arms 107 are held in tension by means of spiral springs 109, the lower ends of which are secured to the upper part of the bearings 108. The springs 109 coil around the vertical part of the rods 107, which protrude through the upper part of the bearings 108 and loosely connect to the sides D⁸. When the arms 107 are pressed rearward by the shock and when the shock is discharged, the arms 107 are then free to resume their normal position by means of the resiliency of the springs 109, which impel said arms 107 to normal position.

The compressing together of the ten sheaves forming the shock is very important in order to avoid unnecessary strain upon the needle and the knotter and also upon the binding-twine in connection therewith. When the shock is compressed in this manner, the needle and the knotter are comparatively free to perform their function and operate very successfully.

The vertical stay-post 100 at the shock-discharging end of the knotter-column R is for the purpose of supporting the shield 94 of the knotter device. The lower part of the post 100 is bent and secured to the lower part of the knotter-column R at 101 and is held firmly and rigid by the stay-rods 102, which are fastened to lugs 103 on the column R and to the collar 104, secured on the said bar 100. The shield 94 of the knotter device is connected to the vertical stay-post 100 by means of the straps 105 of the shield connected to the post 100 at 106. This connection 106 is loosely connected to the post 100.

Caster-wheels 110 are provided to support the shock-discharging end of the machine. For this purpose the oblique tube R² of the needle and knotter columns is provided with a suitable flange 112, located about the middle of the machine. A suitable flange 113, with lower and rearwardly-extending lugs 114, is secured to the flange 112 to support the transverse axle 115, which is pivotally connected to said lugs. The ends of the axle 115 are connected to the caster-wheels at 116. The said casters have the usual swivel connection to their ordinary upper parts, which we do not especially claim. The pivotal connection of the axle to the lugs 114 allows the machine to travel in a level position, though the caster-wheels may travel over uneven ground. The axle 115 is provided with braces 118, which are suitably connected to the axle 115 at 117 and to the flange 113 to retain the axle in transverse position to the machine. The ends of the braces 118 which connect the flange 113 are slotted to allow either end of the axle to slightly rise or fall, as the case may be, when the caster-wheels are passing over uneven ground. The slotted ends of the braces are loosely held by a central and headed stud 119, which projects from the flange 113.

Figure 10:
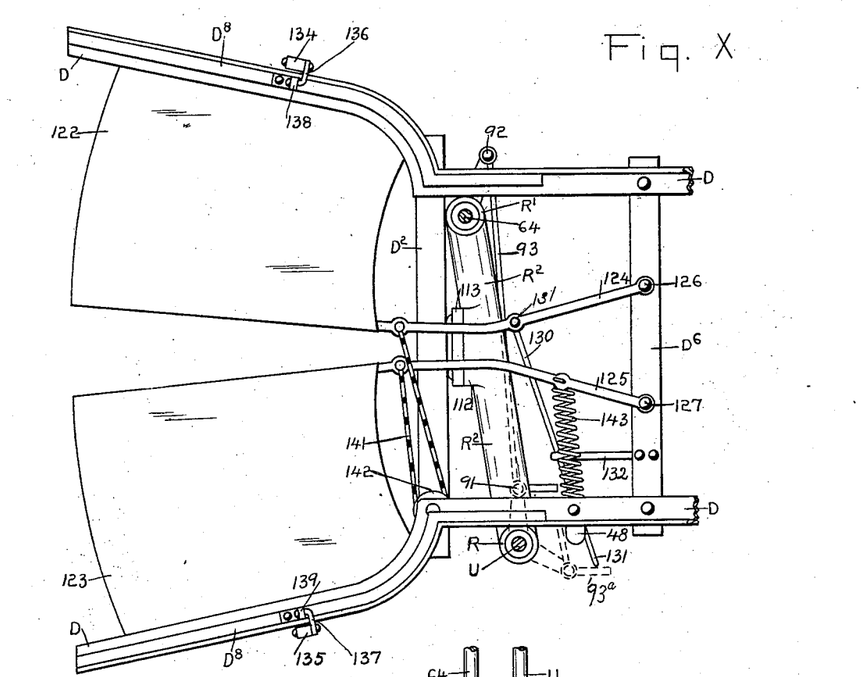
Fig. 10 is a detail plan of the shock-discharging end of the machine, the frame of which is broken, showing especially the sliding doors which support the sheaves while being formed into a shock, and mechanism connected to said doors and to the machine for opening and closing said doors.
Figure 11:
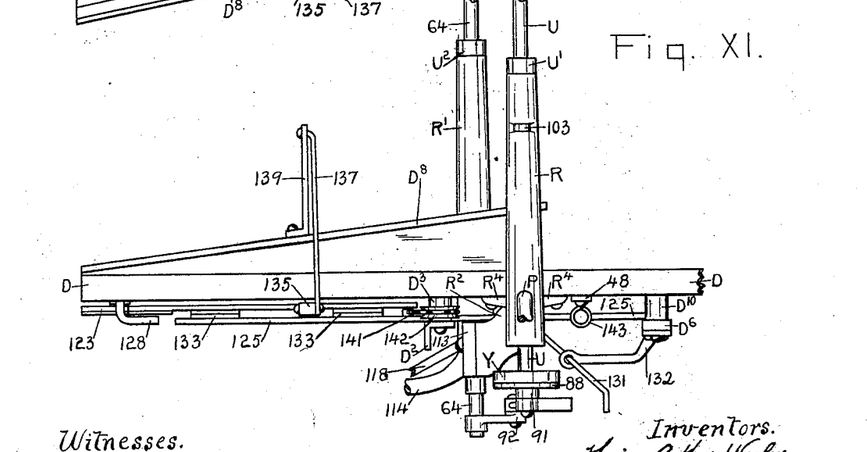
Fig. 11 is a side elevation of Fig. 10, the frame being broken in the same place, these two figures, 10 and 11, being designed expressly to illustrate the sliding doors to discharge the shock.
Figure 12:
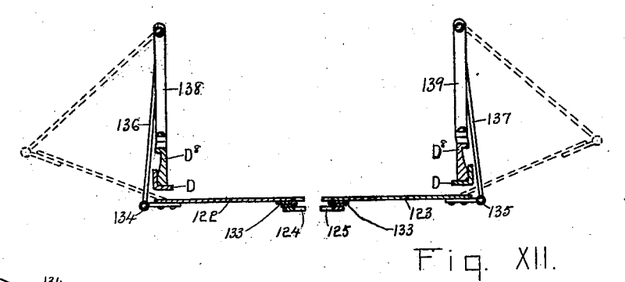
Fig. 12 is a reduced sectional end elevation of the sliding doors at the discharging end of the machine, showing the doors open in broken lines.
Figure 13:
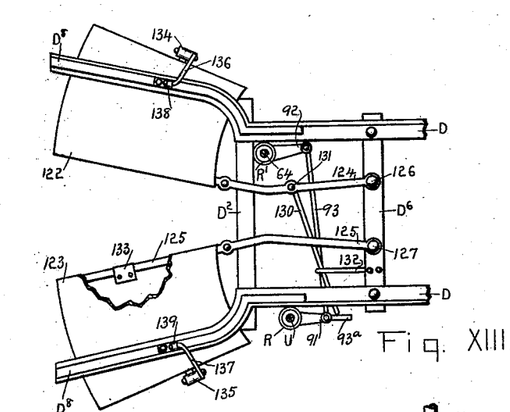
Fig. 13 is a reduced plan of the discharging end of the machine, the doors being partially open, a part of one door being broken away to show one of the hinges which hinge the doors to the arms and the extension of the crank-link engaging the end of the door-opening rod.
Figure 14:
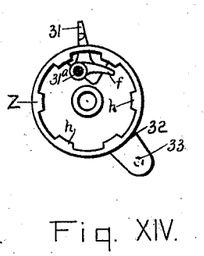
Fig. 14 is an enlarged side view of the detached clutch with clutch plate and catch which operates on the transverse shaft of the machine.
Figure 15:
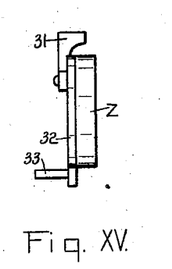
Fig. 15 is an end elevation of the same, showing the arm-lifting pin.
Figure 16:
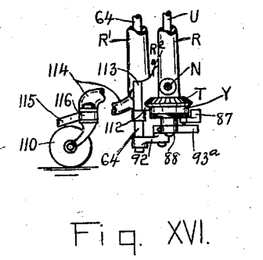
Fig. 16 is a reduced side elevation of the lower end of the needle and knotter columns with connected mechanism and the lug to which the axle of the caster-wheels is connected shown broken.
Figure 17:
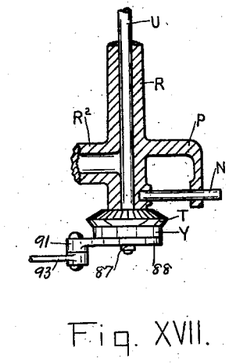
Fig. 17 is an end elevation of the lower part of the knotter-column, showing the bearing in the column for the end of the driving-shaft of the machine.
Figure 18:
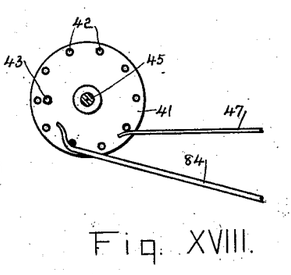
Fig. 18 is a detached elevation of the counter-wheel, with its rod and tension-spring, as viewed from the interior of the machine.

The shock-discharging end of the machine is provided with sliding doors 122 and 123, parted in the middle of the frame D and which are supported by the widened-out end of the frame D and by the horizontal arms 124 and 125, which are pivoted at 126 and 127 to a transverse bar D⁶, which is secured to the frame D. The said widened-out part commences to widen at a transverse line in proximity to the needle-column. The outer ends of these sliding doors are supported and guided by bearings 128, which are secured to and underneath the widened-out ends of the sides of the frame. The arms 124 and 125 rest upon the needle and knotter column tube R² and the transverse bar D² and are secured to the under side of the sliding doors. (Shown more fully in Figs. 10 and 11 of the drawing.) These arms 124 and 125 support the inner parts of the sliding doors and open and close the said doors at the time that the knotter-shaft revolves once. The opening of the sliding doors is accomplished by means of the crank 91 of the knotter-shaft U engaging with the end of the rod 130, which is pivotally connected at 131 to the arm 124.

The rod 130 slides in a guide and bearing 132, which is secured to the transverse bar D⁶, which is secured to the under side of the frame D by means of hangers D¹⁰. The arms 124 and 125 have hinges 133, to which the inner edges of the sliding doors are secured. These hinges allow the outer edges of the doors to be brought upward when said doors are being opened. At the shock-discharging end of the machine are sides D⁸, secured to the frame D and which incline from the needle and knotter columns to the discharging end of the machine. These sides D⁸ are side guides for the sheaves forming the shock and supports for the sliding doors. The outer edges of the sliding doors are provided with lugs 134 and 135, secured thereto and to which are pivotally connected their respective connecting-rods 136 and 137, the upper ends of which are pivotally connected to their respective bearings 138 and 139, secured to the sides D⁸ of the frame D. These rods 136 and 137 bring the outer parts of the sliding doors beyond the sides of the frame and upward on their hinges 133 when the doors are operated.

When the knotter-shaft is revolved, as previously mentioned, the crank 91 of the knotter-shaft is pivotally connected to the rod or link 93, which has an extension 93ª in proximity to the crank 91 and at about right angles to the rod or link 93 and when revolved about one half-revolution engages with the end of the pivotal rod 130 and forces the arm 124, with its door 122, to open outward, and in order to force the other arm 125, with its door 123, outward a cable 141 is provided, one end of said cable being secured to the arm 124 and passing around a spool 142, journaled on the under side of the frame D at the knotter side of the machine, and the other end of the cable is secured to the arm 125. When the crank 91 revolves, the extended end 93ª of link 93 presses against the end of the rod 130 and opens the said sliding doors by means of said connections. When these sliding doors are thus opened, the shock then falls to the ground and stands in vertical position, and by the fact of the machine moving forward the shock is left standing on the ground. After the shock is thus discharged the sliding doors are brought to normal position by means of a spiral spring 143, one end of which is secured to the arm 125 and its other end secured to a lug 48 on the under side of the frame D. When the crank 91 has revolved sufficiently to clear the rod 130, the resiliency of the spring 143 brings the arm 125, with its door 123, to normal position, and at the same time and by the action of said cable 141 the arm 124, with its door 122, is brought to normal position. Thus both doors are closed and again in position to receive a number of sheaves to form a shock.

The operation of the machine is as follows: When the machine is shocking the sheaves from a reaping and binding machine, a sheaf in a horizontal position is delivered from the reaper and engages an arm 22 in an inclined position adapted to receive the sheaf. This arm is supported on a horizontal bar 23 of the framework of the machine and opposite to the sheaf-delivery part of the reaper-machine. On this same horizontal bar is a guiding-arm 25, which follows the butt-end part of the sheaf and assists in placing that part of the sheaf on the incline board 44 of the machine. At this time the upper part of the sheaf is resting on the lower blade 51 of the reel 50, which raises the said upper part of the sheaf, and the sheaf-forwarding arm 73 forwards the butt-end of the sheaf and stands the sheaf in vertical position. The following blade of the reel forwards the head part of the sheaf, and the sheaf-forwarding bar forwards the butt-end of the sheaf toward the needle and the knotter. The horizontal bar 23, referred to, makes about one-fourth of a revolution by means of the contact and gravity of the delivered sheaf. At this time the pivoted arm 29 is raised by means of mechanism connected to said horizontal bar 23 and to the arm 29 to lift said arm in order to release the end of said arm from a catch 31 of the clutch-plate 32 to allow the shaft 2 to make three revolutions. On the shaft 2 is a pinion-wheel 35 to drive the spur-wheel with cam-flange. The arm 29 is then lifted higher by means of a lifter on said clutch-plate 32 and lifts the pin 39 of the arm 29 onto the cam-flange 37 of the spur-wheel 36 to allow the shaft 2 to make its second and third revolution. At this time the sheaf-forwarding bar 21 on its chain is revolved once, the reel is revolved one half-revolution, and the sheaf-forwarding arm makes its one-fourth revolution and then resumes its normal position. After this is accomplished the cam-flange 37 of the spur-wheel 36 has passed the pin 39 and allowed the pin 39, with its arm 29, to descend to normal position. At the said descending of the arm 29 the end thereof engages the catch 31 to discontinue the revolving of the shaft 2 and to bring the arms 22 and 25 to normal position by means of the spring 40 on the said horizontal bar 23 and described mechanism connected thereto. When the sheaf has been forwarded to the needle and the knotter, the sheaf receiving, placing, and forwarding mechanism has resumed its normal position and the counter-wheel 41 has revolved one-tenth of a revolution by means of a tooth 44 on the spur-wheel 36 engaging a pin 42 at the said forwarding of every single sheaf. When the tenth sheaf has been forwarded, the counter-wheel 41 has revolved one revolution. At this time the independent pin 43 of the counter draws the rod 84, which in consequence draws the transverse lever 85 from the catch 87 of the clutch-plate 88 of the knotter-shaft to revolve the knotter-shaft U once and oscillate the needle-shaft 64 to tie the shock. At this time the needle draws the reel 50 and the hoop-strap 98 toward the shock to compress the same while tying. When the shock is tied, the needle resumes its normal position, together with the reel and the hoop-strap, by the described mechanism. The hoop-strap 98, together with the reel, releases the shock and allows it to fall to the ground. The knotter-shaft at about its last half-revolution opens the sliding doors 122 and 123 by means of the described mechanism and allows the shock to fall on the ground and by the fact of the machine traveling onward leaves the shock in an upright position on the ground. The sliding doors 122 and 123 close by means of the spiral spring 143, previously referred to.

Various changes in the form, proportion, and minor details of this invention may be resorted to without departing from the spirit and scope thereof. Hence

What we claim as our invention, and desire to secure by Letters Patent, is—

1. In a shocking-machine, a frame, adjusting-bars secured to the under side of the sides of the frame and at the sheaf-receiving end thereof, a series of transverse recesses in said bars and transversely opposite to each other, a transverse carrying-tube in said opposite recesses, and extending beyond the sides of the machine, adjustable collars on said tube and against the outer side of said recessed bars, to allow side adjustment to the machine, one end of said tube extending for rigid connection with the sheaf-delivery side of a reaper-machine, substantially as described.

2. In a shocking-machine, a frame, a sheaf-receiving arm, a horizontal bar, bearings secured to the frame at the sheaf-receiving end, and at the reaper side thereof, for said bar to oscillate, said arm secured to said bar and capable of adjustment thereon to suit different lengths of sheaves, said arm operated by a sheaf, a guiding-arm adjustably secured on said bar, to follow and guide the sheaf to position on the machine, substantially as described.

3. In a shocking-machine, a frame, an inclined floor at the sheaf-receiving end thereof, a sheaf-receiving arm, a horizontal bar, bearings on the frame at the sheaf-receiving end thereof, to support the bar, said arm secured to the bar and capable of adjustment on the bar to suit different relative positions of the machine to the reaper and different lengths of sheaves, a guiding-arm adjustably secured on said bar to follow the sheaf to position on the machine, substantially as described.

4. In a shocking-machine, a frame, a horizontal bar at the sheaf-receiving end of the frame, bearings on the frame to support and to allow said bar to oscillate, a crank on the end of the bar, a side arm pivotally connected to the side of the frame, and next to the reaper, a lower extension to said pivotal arm, a bent extension at the end of said side arm, a rod connected to said crank and to the end of said lower extension, substantially as described.

5. In a shocking-machine, a frame, a vertical tube secured to the frame, a post in and above the tube, a hub on said post, a vertical bar with lower horizontal extension, a guide on said tube for said extension to slide in, a hub on the upper part of the bar, a reel-shaft to revolve in said hub, a lower hub on the bar, a lower hub on the post, a horizontal bar secured to said lower hub of the bar and capable of sliding horizontally through said lower hub of the post, substantially as described.

6. In a shocking-machine, a frame, a side arm pivotally connected to the side of the frame, and at the sheaf-receiving end thereof, a transverse shaft, a clutch-wheel loosely connected to said shaft, a spur pinion-wheel secured on the shaft, bearings secured to the frame to support the shaft, a pin projecting from the inner side of said arm, a spur-wheel three times as large as the first-named spur-wheel, a rigid stud on the frame to support the larger wheel, a cam-flange on said larger spur-wheel, an opening in said cam-flange, to allow said pin to pass through, and means for lifting said side arm to allow the pin to pass through said opening and onto the cam-flange to allow the transverse shaft to make three revolutions, substantially as described.

7. In a shocking-machine, a frame, a side arm pivoted to the side of the frame at the sheaf-receiving end, a transverse shaft, a sprocket-wheel with clutch-wheel loosely connected on said shaft, a clutch-plate with catch secured on the shaft, a spur pinion-wheel secured on said shaft, bearings on the frame to support the shaft, means for raising the arm at the reception of a sheaf, a spur-wheel three times as large as the first-named spur-wheel to gear into said pinion, a stud on the frame, to allow the spur-wheel to revolve thereon, a cam-flange on the face of the larger spur-wheel, a lip on said side arm, a lifter-pin on said clutch-plate to engage with said lip, to lift the side arm higher, a pin on the side arm to pass through the opening of the cam-flange, to allow the cam-flange to pass under the pin, to continuously lift the same and allow the said spur-wheel to revolve once and the pinion with its shaft to make a second and third revolution, a transverse shaft, a sheaf-forwarding arm, and a reel to make one half-revolution and to operate the sheaf-forwarding arm, substantially as described.

8. In a shocking-machine, a vertical tube, a post in and extending above the tube, a vertical needle-shaft, a horizontal bar, a hub on the post, a loosely-fitting hub on the needle-shaft, the horizontal bar capable of sliding through said hubs, a vertical bar with lower extension, a hub secured to said bar and to said horizontal bar, a guide on the tube to receive said lower extension, an upper hub on said vertical bar and a reel capable of revolving in said hub, substantially as described.

9. In a shocking-machine, a frame, a stud on said frame, a spur-wheel mounted loosely on said stud, a cam-flange on the side of said wheel, an opening in the cam-flange, a side arm pivoted to the side of the frame, at the sheaf-receiving end, a pin on said arm, a horizontal bar, bearings on the frame to support said bar, a sheaf-receiving arm secured on said bar, said bar connected to said side arm, a spiral spring secured to the bar and to the frame to lower the said pin through the opening in the cam-flange, at one revolution of said spur-wheel to bring the sheaf-receiving arm to normal position, substantially as described.

10. In a shocking-machine, a frame, a vertical tube secured to the frame, a vertical post in said tube and stationary therewith, a horizontal bar, knotter and needle columns with lower oblique tube secured to the frame, hubs on the needle-column, and on the vertical tube, to support said horizontal bar and allow said bar to slide therein, a vertical bar with lower horizontal end, supported by and secured to said horizontal bar, a reel supported by said vertical bar, transverse blades on said reel, a guide on said vertical tube for the said lower horizontal end of the said vertical bar to slide in and means to slide the reel on the formation of a shock, substantially as described.

11. In a shocking-machine, a reel, with transverse blades extending over a part of the machine and at the sheaf-receiving end, a vertical bar to support the hub of the reel, the lower end of said bar extended at a right angle therewith, to allow the reel to slide with said bar, a frame, a vertical tube secured to the frame, a guide on said tube to guide the said extended end of the bar, and means to revolve the reel one half-revolution by the reception of a sheaf, and to slide the reel toward the shock at the formation of the shock, substantially as described.

12. In a shocking-machine, a vertical tube, a vertical post in and extending above the tube, a sheaf-placing arm, a right-angle bend at one end of the arm, a hub secured to the post, said bent end of arm extending through said hub, a crank secured to the arm and in proximity to the hub, a frame, a stud secured to the frame, a sprocket-wheel, capable of revolving loosely on the stud, an arm on said sprocket, a rod connecting said crank and sprocket-arm, and means for revolving the sprocket with arm once at the reception of a sheaf, substantially as described.

13. In a shocking-machine, a transverse shaft, a frame, bearings on the frame to support said shaft, a sprocket-wheel secured on the shaft, a larger sprocket-wheel, a stud projecting from the frame to support and allow said sprocket to revolve thereon, a chain connecting said sprockets, a vertical post secured to the frame, a hub on said post, a sheaf-forwarding arm with bent end passing through said hub, a crank on the end of said bent part, a connecting-rod, a projecting arm of the said larger sprocket-wheel, said connecting-rod connecting said crank and said projecting arm, and means to revolve the transverse shaft and the sheaf-forwarding arm at the reception of a sheaf, substantially as described.

14. In a shocking-machine, the combination of a transverse shaft, a frame, bearings secured to the frame, to support said shaft, a sprocket-wheel with clutch-wheel to run loosely on the end of the shaft, a clutch-plate with catch secured on the shaft, a bevel-pinion secured on said shaft, an incline shaft supported by a bearing and sleeve on the end of the transverse shaft, a bevel-wheel on the incline shaft and gearing into said pinion, a bevel-pinion on the upper part of the incline shaft, a reel with hub, a transverse reel-shaft, a bevel-wheel secured on said shaft to gear into the bevel-pinion on the inclined shaft, said hub secured to the reel-shaft, a vertical bar with lower horizontal extension, to support the reel-shaft and the upper part of the incline shaft, a vertical tube secured to the frame, and guide on said tube for said horizontal extension on the vertical bar to slide in, substantially as described.

15. In a shocking-machine, vertical knotter and needle columns, a lower oblique tube connecting the columns, a frame, said oblique tube secured to the frame, vertical shafts in said columns and extending above and below said tube, collars on said shafts, and resting on said columns, a hub loosely connected on the needle-shaft, a vertical tube secured to the frame, a post, in, and extending above the tube, a hub secured to the post, a vertical bar, with lower horizontal extension, a guide on the vertical tube for said extension to slide in, a hub on the upper part of said bar, a reel-shaft capable of revolving in said hub, a lower hub secured to the said vertical reel-supporting bar, a horizontal bar secured to the said lower hub, a crank secured to the needle-shaft, a rod connected to said crank and to the horizontal bar to bring the vertical sliding bar toward the knotter and needle when operating to compress the shock, substantially as described.

16. In a shocking-machine, a frame, needle and knotter columns with lower oblique tube connecting said columns and secured to the frame, a hoop-strap above the shock-discharging end of the machine, a knotter-shaft, a knotter-shield on said shaft, a needle-shaft, a needle on said shaft, an arm on the needle, a spiral spring connected to said arm, said hoop-strap connected to said spring and to the hub of the knotter-shield, to compress the shock at the operation of the needle and the knotter, substantially as described.

17. In a shocking-machine, a sheaf-counter wheel, teeth or pins projecting from the inner side of said counter, an independent larger pin projecting from said same side of the counter, a frame, a bracket-bearing secured to the frame, a stud on the bracket-bearing, for the counter to revolve on, a tension-spring secured to the frame, to press on the counter to retain and prevent the same from revolving too far, a loosely-revolving spur-wheel, a stud on the frame for said spur-wheel, a transverse lever, pivoted to the frame, a rod with bent end pivoted to said lever, and supported by said bracket-bearing, the said large pin of the counter to engage with the said bent end of the rod, to draw the same toward the counter, needle and knotter columns with lower oblique tube connecting said columns, and secured to the frame, needle and knotter shafts in said columns, a bevel-wheel with clutch-wheel loosely connected on the lower end of the knotter-shaft, a clutch-plate with catch secured on said knotter-shaft, the bent end of said rod drawn by the large pin of the counter bringing with it the pivoted transverse lever to release said catch to revolve the knotter-shaft once, a spiral spring connected to said lever and to the said frame to bring said lever and rod to normal position, substantially as described.

18. In a shocking-machine, a frame, a side arm pivotally connected to the side of the frame, and at the sheaf-receiving end thereof, a transverse shaft, a spur pinion-wheel secured on the shaft, bearings secured to the frame to support the shaft, a pin projecting from the inner side of said arm, a larger spur-wheel, a stud on the frame to support the wheel, a cam-flange on said spur-wheel, an opening in said flange, a tooth on the side of the spur-wheel, a sheaf-counter wheel, a bracket-bearing secured to the frame to support said counter-wheel, a number of pins in said counter, the said tooth of the spur-wheel to engage successively a pin of the counter at every revolution of the spur-wheel, substantially as described.

19. In a shocking-machine, caster-wheels, a transverse axle connected to said caster-wheels, said axle pivotally connected to lugs, a flange forming a part of said lugs, an oblique tube, needle and knotter columns forming a part of the tube, a frame, said tube secured to the frame, a flange on the middle part of the tube and forming a part of the same, braces connecting the outer ends of the axle to the said flange of the lugs, a headed stud projecting from said flange, slots in said braces to fit between said head of the stud and the flange, to allow the casters to rise and fall on uneven ground and to retain the axle in transverse position to the machine, substantially as described.

20. In a shocking-machine, a frame, sides secured to the frame at the shock-discharging end, said end widened out to facilitate the forming of the shock, curved arms, bearings secured to said sides, said arms pivotally connected to said bearings, spiral springs connected to the bearings and to the arms to press the curved part of the arms against the lower part of the sheaves while forming into a shock, and when the shock is formed, a hoop-strap, a knotter-shield having a hub, a needle, a spiral spring connected to the needle and the hoop-strap connected to the hub and the spring, substantially as described.

21. In a shocking-machine, a frame, said frame widened out at the shock-discharging end, sides to the frame, a transverse bar secured to the under side of the frame, sliding doors, arms pivoted to said transverse bar, a transverse bar secured to the frame to support said arms, hinges secured to said arms and to the doors, lugs on the outer edges of the doors, bearings secured to the upper parts of the sides, rods pivotally connected to said lugs and bearings to support and to bring the doors upward when sliding, bearings secured to the under side of the frame, to support and guide the doors, a rod connected to one of said arms, a bearing secured to the first transverse bar to support and guide said rod, the ends of a cable secured to the said arms, a spool loosely connected to the frame for said cable to operate on, needle and knotter columns with lower oblique tube secured to the frame, a knotter-shaft, a crank on the knotter-shaft, a needle-shaft, a crank on the needle-shaft, a link to connect said cranks, an extension of said link to engage the end of the rod at the last part of the revolution of the crank, to open the doors, to discharge the shock, a spring secured to the frame, and to one said arm adjacent to the knotter, to close the doors, substantially as described.

22. In a shocking-machine, sliding doors at the shock-discharging end of the machine, a frame widened out at the said end of the machine, a transverse bar secured to the frame, horizontal arms pivoted to said bar, a second transverse bar secured to the frame to support said arms, hinges secured to the doors and to the arms, bearings secured to the under side of the frame to support and guide the outer parts of the doors, sides secured to the widened-out part of the frame, bearings secured on said sides, lugs secured to the doors, rods connecting said lugs and bearings to bring the outer parts of the doors upward on their said hinges, and means for opening the doors to allow the shock to drop, and to close the doors, substantially as described.

THOMAS ARTHUR WOOLEY.
HERBERT FOX.

Witnesses:
JOHN H. HENDRY,
B. E. HERALD.